(12) United States Patent
Hepworth et al.

(10) Patent No.: US 7,204,417 B2
(45) Date of Patent: Apr. 17, 2007

(54) GRAPHICAL CODE READER THAT IS CONFIGURED FOR EFFICIENT DECODER MANAGEMENT

(75) Inventors: Paul Hepworth, Riverton, UT (US); George Powell, Sandy, UT (US)

(73) Assignee: The Code Corporation, Draper, UT (US)

( * ) Notice: Subject to any disclaimer, the term of this patent is extended or adjusted under 35 U.S.C. 154(b) by 223 days.

(21) Appl. No.: 10/980,444

(22) Filed: Nov. 3, 2004

(65) Prior Publication Data

US 2006/0091217 A1 May 4, 2006

(51) Int. Cl.
G06K 7/10 (2006.01)

(52) U.S. Cl. ................... 235/454; 235/462.01

(58) Field of Classification Search ................ 235/462.01–462.45, 472.01, 472.02, 472.03, 235/454, 494, 455; 714/764, 704; 712/211, 712/215, 230, 248
See application file for complete search history.

(56) References Cited

U.S. PATENT DOCUMENTS

| | | | |
|---|---|---|---|
| 3,513,320 A | 5/1970 | Weldon | |
| 4,319,336 A | 3/1982 | Anderson et al. | |
| 4,488,679 A | 12/1984 | Bockholt et al. | |
| 4,654,718 A | 3/1987 | Sueyoshi | |
| 4,752,675 A | 6/1988 | Zetmeir | |
| 4,896,029 A | 1/1990 | Chandler et al. | |
| 4,958,064 A | 9/1990 | Kirkpatrick | |
| 4,998,010 A | 3/1991 | Chandler et al. | |
| 5,005,121 A * | 4/1991 | Nakada et al. ................ | 710/26 |
| 5,047,614 A | 9/1991 | Bianco | |
| 5,113,445 A | 5/1992 | Wang | |
| 5,153,418 A | 10/1992 | Batterman et al. | |
| 5,159,635 A | 10/1992 | Wang | |
| 5,189,292 A | 2/1993 | Batterman et al. | |
| 5,223,701 A | 6/1993 | Batterman et al. | |
| 5,343,028 A | 8/1994 | Figarella et al. | |
| 5,352,878 A | 10/1994 | Smith et al. | |
| 5,394,558 A * | 2/1995 | Arakawa et al. ............ | 712/211 |
| 5,412,196 A | 5/1995 | Surka | |

(Continued)

FOREIGN PATENT DOCUMENTS

EP 0837406 A2 4/1998

(Continued)

OTHER PUBLICATIONS

"Punched Cards to Bar Codes," Benjamin Nelson, Helmers Publishing, Inc. 1997, pp. 1-16, no month.

(Continued)

*Primary Examiner*—Thien M. Le

(57) ABSTRACT

A graphical code reader is disclosed. The graphical code reader includes a processor and memory in electronic communication with the processor. The memory is used for storing a digital image of a graphical code. The graphical code reader also includes a plurality of decoders. Each decoder of the plurality of decoders is cofigured to decode at least one graphical code symbology. The graphical code reader also includes a decoder manager that implements a method. The method involves identifying a most recently successful decoder from the plurality of decoders. The most recently successful decoder decoded a most recently decoded graphical code. The method also involves instructing the most recently successful decoder to process the digital image before instructing any other decoder to process the digital image.

26 Claims, 6 Drawing Sheets

U.S. PATENT DOCUMENTS

| | | | |
|---|---|---|---|
| 5,428,211 A | 6/1995 | Zheng et al. | |
| 5,438,188 A | 8/1995 | Surka | |
| 5,465,291 A | 11/1995 | Barrus et al. | |
| 5,478,999 A | 12/1995 | Figarella et al. | |
| 5,483,052 A | 1/1996 | Smith, III et al. | |
| 5,493,105 A | 2/1996 | Desai | |
| 5,545,887 A * | 8/1996 | Smith et al. | 235/462.08 |
| 5,604,640 A | 2/1997 | Zipf et al. | |
| 5,612,527 A | 3/1997 | Ovadia | |
| 5,804,803 A | 9/1998 | Cragun et al. | |
| 5,835,615 A | 11/1998 | Lubow et al. | |
| 5,850,080 A | 12/1998 | Herzig | |
| 5,853,252 A | 12/1998 | Wright et al. | |
| 5,869,819 A | 2/1999 | Knowles et al. | |
| 5,903,729 A | 5/1999 | Reber et al. | |
| 5,905,248 A | 5/1999 | Russell et al. | |
| 5,905,251 A | 5/1999 | Knowles | |
| 5,933,634 A | 8/1999 | Enokido et al. | |
| 5,933,829 A | 8/1999 | Durst et al. | |
| 5,938,726 A | 8/1999 | Reber et al. | |
| 5,938,727 A | 8/1999 | Ikeda | |
| 5,978,773 A | 11/1999 | Hudetz et al. | |
| 5,984,193 A | 11/1999 | Uhling | |
| 5,992,752 A | 11/1999 | Wilz, Sr. et al. | |
| 6,012,102 A | 1/2000 | Shachar | |
| 6,027,024 A | 2/2000 | Knowles | |
| 6,032,195 A | 2/2000 | Reber et al. | |
| 6,068,188 A | 5/2000 | Knowles | |
| 6,076,733 A | 6/2000 | Wilz, Sr. et al. | |
| 6,098,106 A | 8/2000 | Philyaw et al. | |
| 6,108,656 A | 8/2000 | Durst et al. | |
| 6,138,151 A | 10/2000 | Reber et al. | |
| 6,154,738 A | 11/2000 | Call | |
| 6,247,646 B1 | 6/2001 | Iwaguchi et al. | |
| 6,377,986 B1 | 4/2002 | Philyaw et al. | |
| 6,384,744 B1 | 5/2002 | Philyaw et al. | |
| 6,535,883 B1 | 3/2003 | Lee et al. | |
| 6,564,249 B2 | 5/2003 | Shiigi | |
| 6,584,601 B1 | 6/2003 | Kodosky et al. | |
| 6,601,772 B1 | 8/2003 | Rubin et al. | |
| 6,834,803 B2 | 12/2004 | Schuessler | |
| 7,055,081 B2 * | 5/2006 | Boyer et al. | 714/764 |
| 2002/0129316 A1 * | 9/2002 | Boyer et al. | 714/764 |
| 2002/0147743 A1 | 10/2002 | Le et al. | |
| 2003/0088643 A1 | 5/2003 | Shupps et al. | |
| 2004/0199835 A1 * | 10/2004 | Belotserkovsky et al. | 714/704 |
| 2004/0254788 A1 * | 12/2004 | Eller et al. | 704/219 |
| 2005/0286657 A1 * | 12/2005 | Thyssen et al. | 375/340 |
| 2006/0091217 A1 * | 5/2006 | Hepworth et al. | 235/462.07 |
| 2006/0133542 A1 * | 6/2006 | Julian | 375/340 |
| 2006/0138236 A1 * | 6/2006 | Hepworth et al. | 235/454 |

FOREIGN PATENT DOCUMENTS

| | | |
|---|---|---|
| WO | WO98/03923 | 1/1998 |
| WO | WO98/06055 | 2/1998 |
| WO | WO98/24036 | 6/1998 |
| WO | WO98/40823 | 9/1998 |
| WO | WO98/49813 | 11/1998 |
| WO | WO99/04326 | 1/1999 |

OTHER PUBLICATIONS

"MiniCode," http://www.omniplanar.com/minicode.html, pp. 1-10, May 17, 1999.

* cited by examiner

GRAPHICAL CODE READER THAT IS CONFIGURED FOR EFFICIENT DECODER MANAGEMENT

TECHNICAL FIELD

The present invention relates generally to graphical code readers. More specifically, the present invention relates to graphical code readers that are capable of decoding different graphical code symbologies.

BACKGROUND

A machine-readable graphical code ("graphical code") is a graphical representation of information that consists of multiple graphical code elements having different light reflective or light emissive properties. Examples of different types of graphical codes include bar codes, data matrix codes, MaxiCodes, and so forth. Graphical codes have become widely used in many commercial environments, such as point-of-sale stations in retail stores and supermarkets, inventory and document tracking, and the like.

Devices for identifying or extracting information from graphical codes are generally referred to as graphical code readers. Image-based graphical code readers typically include one or more light sources for illuminating a graphical code. Light is reflected from the graphical code toward the graphical code reader. A lens within the graphical code reader focuses an image of the graphical code onto an image sensor. Pixels within the image sensor are read electronically to provide a two-dimensional array of image data corresponding to the graphical code. A decoder then processes the image data and extracts the information contained in the graphical code.

Graphical codes may be encoded according to a wide variety of different symbologies. A symbology is a protocol for arranging the graphical code elements that make up a particular kind of graphical code. In some symbologies, the same information is contained throughout the height of the code, making such codes vertically redundant. Some examples of such linear or one-dimensional graphical code symbologies are UPC, Code 128, Code 39, Interleaved 2 of 5, Codabar, MSI Plessey, Code 93, etc. Graphical codes that are encoded in accordance with two-dimensional graphical code symbologies are also commonly used. Some examples of two-dimensional graphical code symbologies are GoCode, Maxicode, PDF 417, Data Matrix, Datastrip, etc.

Two-dimensional graphical codes possess several advantages over one-dimensional graphical codes. For example, two-dimensional graphical codes are designed to store considerably more information than one-dimensional graphical codes. In addition, two-dimensional graphical codes are typically smaller than one-dimensional codes. Also, in some cases, two-dimensional graphical codes do not require a high level of print quality in order to be decoded.

Some graphical code readers are capable of decoding different graphical code symbologies. Such graphical code readers typically include multiple decoders, each of which is configured to decode a specific graphical code symbology. In such a graphical code reader, benefits may be realized by improvements in the way that the multiple decoders are managed during various stages of the decoding process.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
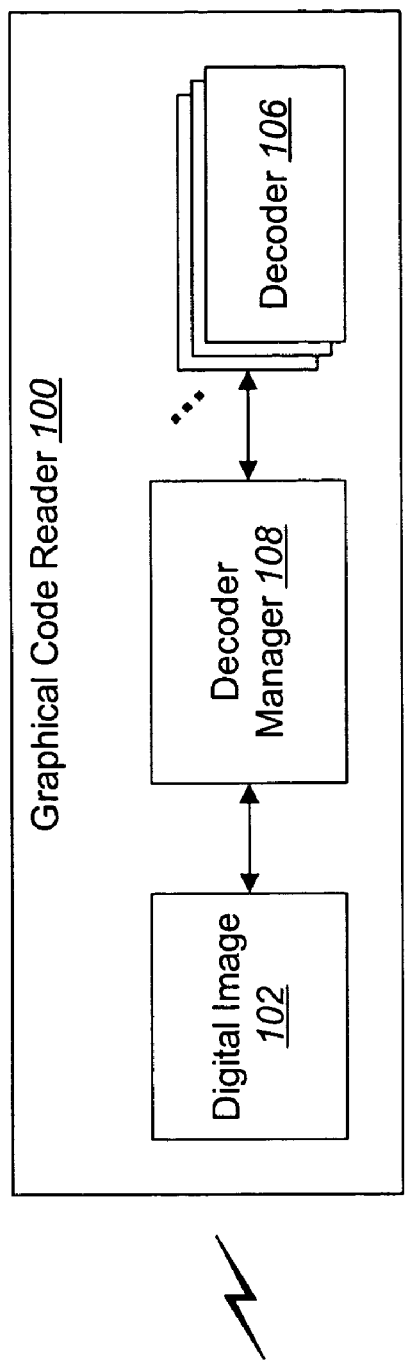
FIG. 1 is a block diagram illustrating an embodiment of a graphical code reader.

A graphical code reader is disclosed. The graphical code reader includes a processor and memory in electronic communication with the processor. The memory is used for storing a digital image of a graphical code. The graphical code reader also includes a plurality of decoders. Each decoder of the plurality of decoders is configured to decode at least one graphical code symbology. The graphical code reader also includes a decoder manager. The decoder manager implements a method that involves identifying a most recently successful decoder from the plurality of decoders. The most recently successful decoder decoded a most recently decoded graphical code. The method also involves instructing the most recently successful decoder to process the digital image before instructing any other decoder to process the digital image.

If the most recently successful decoder does not decode the graphical code, the method may also involve repeatedly instructing a different decoder from the plurality of decoders to process the digital image until the graphical code is decoded or each of the plurality of decoders has processed the digital image. In some embodiments, the plurality of decoders are selected in order of increasing time since a most recent decode.

In some embodiments, the plurality of decoders include an active set of decoders and an archived set of decoders. In such embodiments, if the most recently successful decoder does not decode the graphical code, the method may involve repeatedly instructing a different decoder from the active set of decoders to process the digital image until the graphical code is decoded or each decoder in the active set of decoders has processed the digital image. If each decoder in the active set of decoders processes the digital image without decoding the graphical code, the method may also involve determining whether a condition has been satisfied for using the archived set of decoders. In some embodiments, the condition is that N most recent digital images captured by the graphical code reader have not been decoded. If the condition has been satisfied, the method may also involve repeatedly instructing a different decoder from the archived set of decoders to process the digital image until the graphical code is decoded or each decoder in the archived set of decoders has processed the digital image. If the condition has not been satisfied, the method may also involve not instructing any decoder in the archived set of decoders to process the digital image.

If a decoder in the active set processes but does not decode the graphical code, the method may also involve determining whether a condition has been satisfied for moving the decoder from the active set of decoders to the archived set of decoders. If the condition has been satisfied, the method may also involve moving the decoder from the active set of decoders to the archived set of decoders. In some embodiments, the condition is that the decoder has not decoded any of N most recent digital images captured by the graphical code reader.

In some embodiments, the method may additionally involve stopping processing of the digital image after a defined time period. The defined time period may correspond to an estimate of high probability decoding time. Alternatively, or in addition, the method may involve, for each decoder that is tried, stopping processing of the digital image by the decoder after a defined time period. The defined time period for a particular decoder may correspond to an estimate of high probability decoding time for that decoder.

A method in a graphical code reader is also disclosed. The method involves identifying a most recently successful decoder from a plurality of decoders. Each decoder of the plurality of decoders is configured to decode at least one graphical code symbology. The most recently successful decoder decoded a most recently decoded graphical code. The method also involves instructing the most recently successful decoder to process a digital image of a graphical code before instructing any other decoder to process the digital image.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram illustrating an embodiment of a graphical code reader 100. Some of the components in the graphical code reader 100 are functional components that may be implemented using any suitable combination of hardware, software, and/or firmware. In some embodiments, multiple functional components may be implemented by the same physical component.

The graphical code reader 100 includes one or more digital images 102 of graphical codes 104. The graphical code reader 100 typically includes several components for capturing the digital images 102. Those components are not shown in FIG. 1, but will be discussed below in connection with FIG. 6. The digital images 102 may be stored in memory within the graphical code reader 100.

The graphical code reader 100 includes a plurality of decoders 106. Each decoder 106 is configured to decode digital images 102 of graphical codes 104 that are encoded according to one or more symbologies. For example, the graphical code reader 100 may include a UPC decoder 106 that is configured to decode images 102 of UPC codes 104, a PDF 417 decoder 106 that is designed to decode images 102 of PDF 417 codes 104, a Data Matrix decoder 106 that is designed to decode images 102 of Data Matrix codes 104, and so forth. The graphical code reader 100 may include only one-dimensional symbology decoders 106, only two-dimensional symbology decoders 106, or combinations of one- and two-dimensional symbology decoders.

Some decoders 106 may be configured to decode more than one symbology. For example, a single decoder 106 may be configured to decode UPC codes 104, EAN codes 104, Code128 codes 104, etc. (much of the processing is common between the decoding algorithms for these closely related symbologies). Such a "group decoder" 106 can be treated as a single decoder 106 or can be treated as two or more decoders 106, each decoding a subset of the full group (using flags to specify which symbologies in the group are active).

The graphical code reader 100 also includes a decoder manager 108. In general terms, the decoder manager 108 manages the different decoders 106 in the graphical code reader 100. For example, when a digital image 102 has been captured and is ready for processing, the decoder manager 108 determines which decoder 106 (or decoders 106) will process the image 102. Additional details about the configuration and operation of various embodiments of the decoder manager 108 will be provided below.

Figure 2:
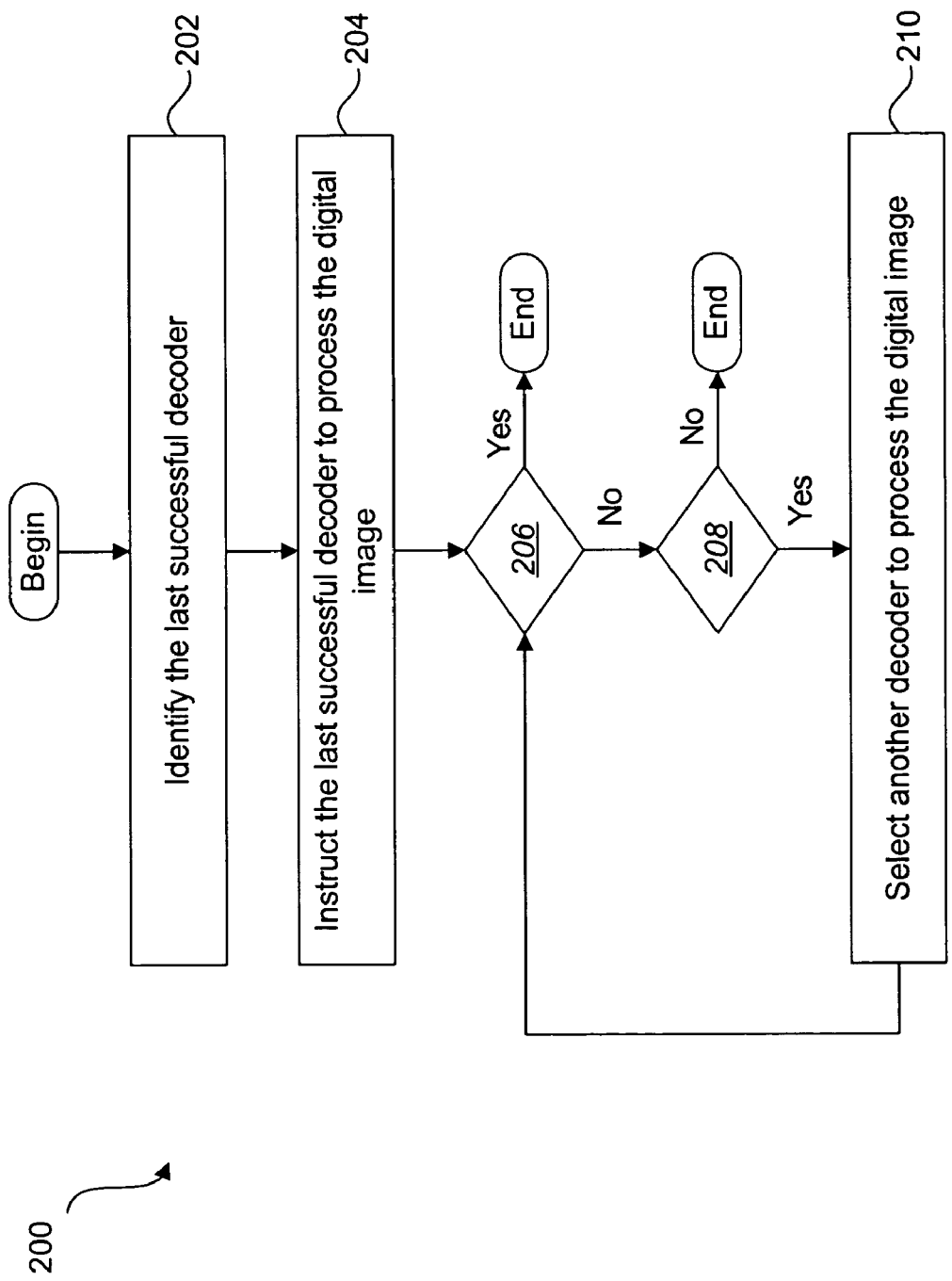
FIG. 2 is a flow diagram illustrating an embodiment of a method that may be performed by the decoder manager.

In typical operation, the graphical code reader 100 repeatedly performs the following steps: capturing an image 102, processing the image 102 (edge enhancement, threshold, etc.), decoding the image 102, and processing the decoded data. The reader 100 then captures another image 102, and the process repeats indefinitely. FIG. 2 is a flow diagram illustrating an embodiment of a method 200 for decoding an image 102 that has been captured by the reader 100.

The method 200 begins when the decoder manager 108 identifies 202 the decoder 106 that was used to decode the most recently decoded graphical code 104. This decoder 106 will be referred to from now on as the most recently successful decoder 106. The decoder manager 108 then instructs 204 the most recently successful decoder 106 to process the digital image 102. When the decoder 106 has finished processing the digital image 102, the decoder manager 108 determines 206 whether the most recently successful decoder 106 decoded the graphical code 104 in the image 102.

If the decoder 106 successfully decoded the graphical code 104, the method 200 then ends. If the decoder 106 did not successfully decode the graphical code 104, the decoder manager 108 then determines 208 whether all of the decoders 106 have processed the image 102. If so, the method 200 ends.

If there are one or more decoders 106 that have not processed the image 102, the decoder manager 108 selects 210 another decoder 106 to process the digital image 102. In some embodiments, the decoders 106 are selected in order of increasing time since a most recent decode. In other words, the decoder manager 108 selects 210 the decoder 106 that successfully decoded a graphical code 104 most recently (out of those decoders 106 that have not yet processed the digital image 102). The method 200 then returns to step 206 and proceeds as described above. More specifically, in step 206 it is determined whether the decoder 106 selected in step 210 successfully decoded the graphical code 104. If so, the method 200 ends. If not, another decoder 106 is selected (if one is available), and so on.

In some embodiments, the total time spent decoding (regardless of which decoders 106 are used) may be used to end the method 200. In other words, the reader 100 may be configured so that processing of the image 102 stops after a defined time period. This time period may correspond to an estimate of "high probability" decoding time. More specifically, the reader 100 may be configured to first process the portions of an image 102 that have the highest probability of including a graphical code 104. This is sometimes referred to as processing the "best candidates" before the "worst candidates." For example, a simplistic best candidate choice would be to start analysis of an image 102 at the center and work outward, because the operator of the reader 100 typically attempts to place the code 104 in the center of the field of view of the image capture component (not shown) of the reader 100. Another approach would be to examine the image 102 at low resolution to locate and rank candidate areas and then examine each candidate area at high resolution. Whatever approach is followed, the processing of the image 102 may be thought of as including high probability decoding time followed by lower probability decoding time. In some embodiments, the reader 100 may be configured so that decoding stops after the high probability decoding time has elapsed and before the lower probability decoding time begins. Additional details about such embodiments are provided in U.S. patent application Ser. No. 10/776,449, entitled "Systems And Methods For Concurrent Image Capture And Decoding Of Graphical Codes," filed Feb. 11, 2004, assigned to the assignee of the present invention and hereby incorporated by reference in its entirety.

In some embodiments, each decoder 106 in the reader 100 may be associated with an estimated high probability decoding time. The estimated high probability decoding time may vary among decoders 106. The decoder manager 108 may be configured to stop each decoder 106 from processing an image 102 after the estimated high probability decoding time for that particular decoder 106 has elapsed. This may be done instead of or in addition to stopping all of the decoders 106 based on a time limit.

Figure 3:
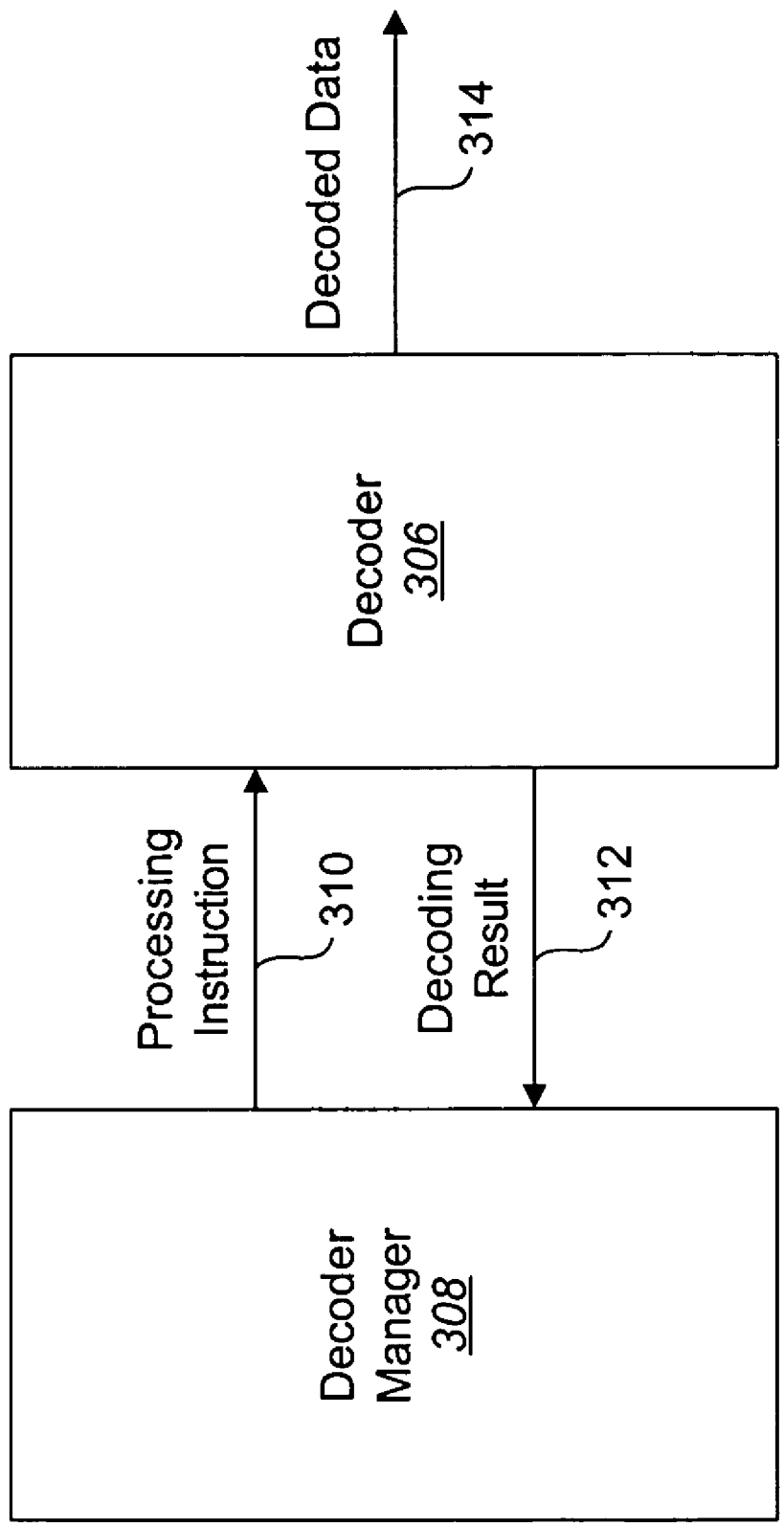
FIG. 3 is a signal flow diagram illustrating exemplary interaction between an embodiment of the decoder manager and an embodiment of a decoder while the method of FIG. 2 is being performed.

FIG. 3 is a signal flow diagram illustrating exemplary interaction between an embodiment of the decoder manager 308 and an embodiment of a decoder 306 while the method 200 of FIG. 2 is being performed. FIG. 3 shows the interaction between a decoder manager 308 and a single decoder 306. The decoder manager 308 may have this same type of interaction with multiple decoders 306 while the method 200 of FIG. 2 is being performed.

The decoder manager 308 sends an instruction 310 to the decoder 306 to process a digital image 102 of a graphical code 104. The processing instruction 310 may include a location of the digital image 102, or the digital image 102 itself. When the decoder 306 finishes processing the digital image 102, the decoder 306 sends decoding result information 312 to the decoder manager 308. The decoding result information 312 indicates whether the decoder 306 successfully decoded the graphical code 104. If the decoder 306 successfully decoded the graphical code 104, the decoder 306 outputs the decoded data 314.

Figure 4:
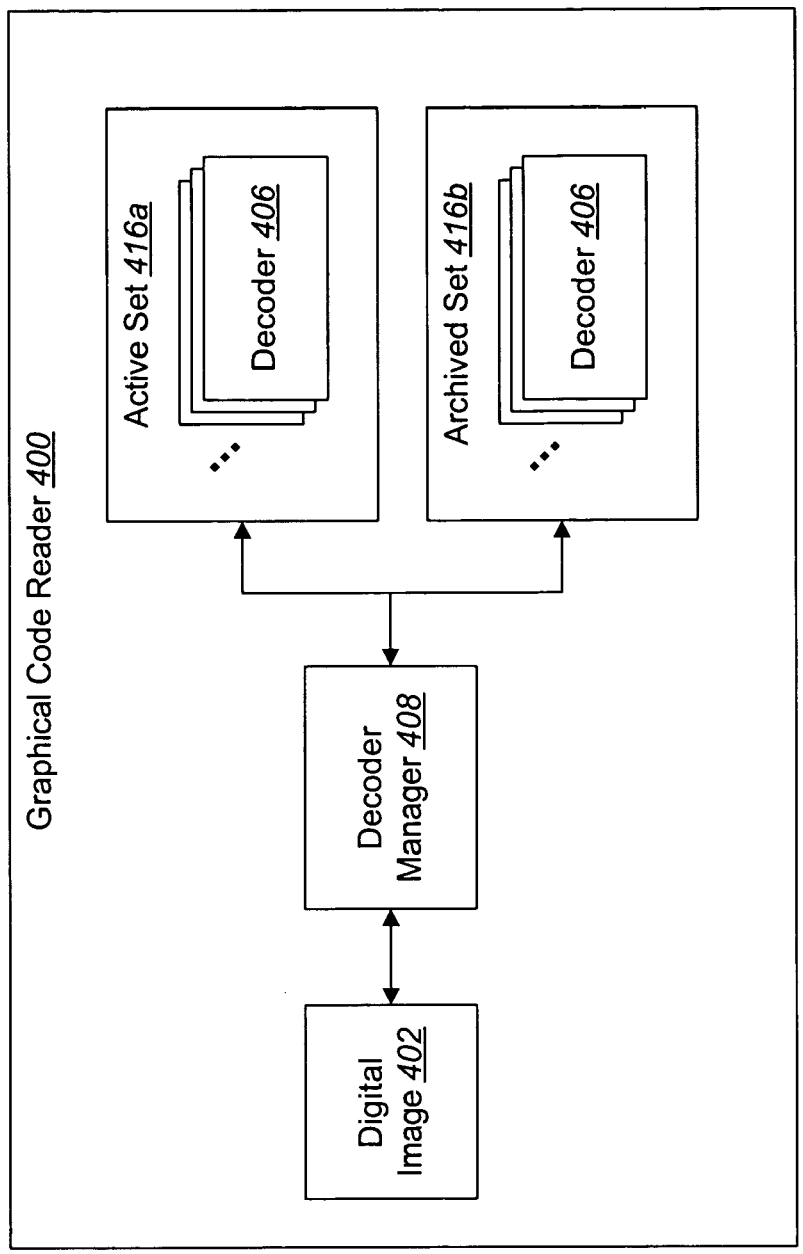
FIG. 4 is a block diagram illustrating another embodiment of a graphical code reader.

FIG. 4 is a block diagram illustrating another embodiment of a graphical code reader 400. As before, the graphical code reader 400 includes a plurality of decoders 406. In the embodiment shown in FIG. 4, the decoders 406 are separated into two sets 416, an active set 416a of decoders 406 and an archived set 416b of decoders 406. Typically, the most recently successful decoder 408 is included in the active set 416a.

Figure 5:
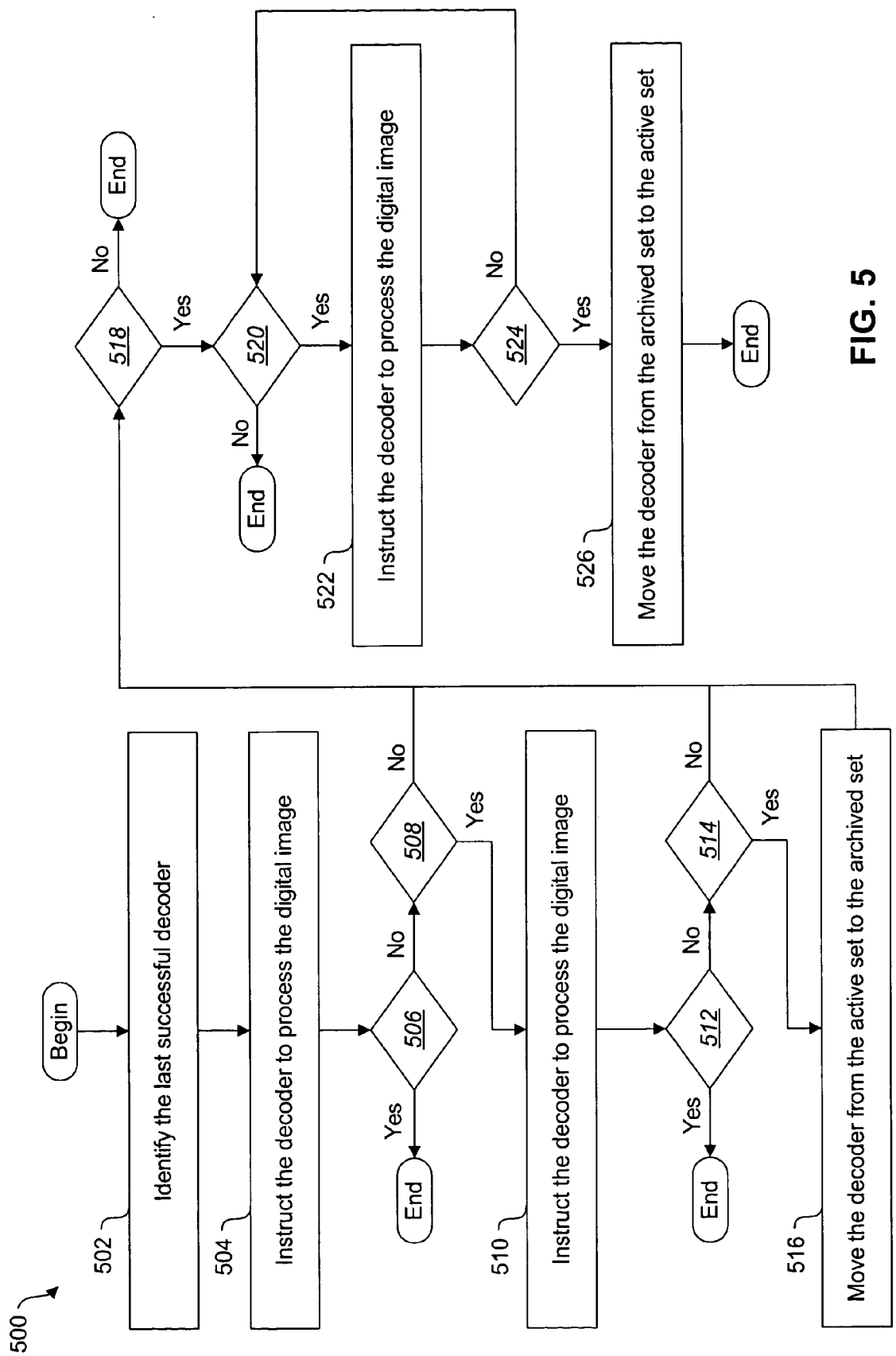
FIG. 5 is a flow diagram illustrating an embodiment of a method that may be performed by the decoder manager in the graphical code reader of FIG. 4.

FIG. 5 is a flow diagram illustrating an embodiment of a method 500 that may be performed by the decoder manager 408 in the graphical code reader 400 of FIG. 4. The decoder manager 408 may perform the method 500 after a digital image 402 of a graphical code 404 has been captured and is ready to be processed.

The method 500 begins when the decoder manager 408 identifies 502 the most recently successful decoder 406. The decoder manager 408 then instructs 504 the most recently successful decoder 406 to process the digital image 402. When the most recently successful decoder 406 has finished processing the digital image 402, the decoder manager 408 determines 506 whether the most recently successful decoder 406 decoded the graphical code 404 in the image 402. If the most recently successful decoder 406 decoded the graphical code 404, the method 500 ends.

If the most recently successful decoder 406 did not decode the graphical code 404 in the image 402, the decoder manager 408 then attempts to identify 508 another decoder 406 in the active set 416a to process the digital image 402. If the decoder manager 408 is not able to identify 508 a decoder 406 in the active set 416a that has not processed the digital image 402, the method 500 skips ahead to step 518, which will be discussed below. If the decoder manager 408 is able to identify 508 a decoder 406 in the active set 416a that has not processed the digital image 402, the decoder manager 408 instructs 510 this decoder 406 to process the digital image 402.

After the decoder 406 has finished processing the digital image 402, the decoder manager 408 determines 512 whether the decoder 406 successfully decoded the graphical code 404 in the image 402. If the decoder 406 successfully decoded the graphical code 404, the method 500 ends. If the decoder 406 did not successfully decode the graphical code 404, the decoder manager 408 determines 514 whether a condition has been satisfied for moving the decoder 406 from the active set 416a to the archived set 416b. In some embodiments, the condition is that the decoder 406 has not decoded any of the last N digital images 402 that have been captured by the graphical code reader 400. The value of N may be greater than or equal to one, and is typically greater than one. If the condition has not been satisfied, the method 500 skips ahead to step 518, which will be discussed below. If the condition has been satisfied, the decoder manager 408 moves 516 the decoder 406 from the active set 416a to the archived set 416b.

The decoder manager 408 then determines 518 whether a condition has been satisfied for using the archived decoders 406 to process the digital image 402. In some embodiments, the condition is that the last N digital images 402 that the graphical code reader 400 has captured have not been decoded. If the decoder manager 408 determines 518 that the condition has not been satisfied, the method 500 ends without the graphical code 404 being decoded. If the decoder manager 408 determines 518 that the condition has been satisfied, the decoder manager 408 then attempts 520 to identify a decoder 406 in the archived set 416b to process the digital image 402. If the decoder manager 408 is not able to identify a decoder 406 in the archived set 416b to process the digital image 402, the method 500 ends without the graphical code 404 being decoded.

If the decoder manager 408 is able to identify a decoder 406 in the archived set 416b to process the digital image 402, the decoder manager 408 instructs 522 this decoder 406 to process the digital image 402. After the decoder 406 finishes processing the digital image 402, the decoder manager 408 determines 524 whether the decoder 406 successfully decoded the graphical code 404. If so, the decoder manager 408 moves 526 the decoder 406 from the archived set 416b to the active set 416a and the method 500 ends. If the decoder 406 did not successfully decode the graphical code 404, the method 500 returns to step 520 and proceeds as described above.

As indicated above, when N nondecodes have occurred (i.e., when the last N images 402 that the reader 400 has captured have not been decoded), the decoder manager 408 may attempt to decode the current image 102 using at least some of the decoders 406 in the archived set 416b. In some embodiments, the decoder manager 408 attempts to decode the current image 102 using M decoders 406 in the archived set 416b, where M is greater than or equal to one.

The order in which the decoders 406 in the archived set 416 are used may depend on one or more factors. A first factor that may be considered is how recently the decoders 406 were used. For example, in some embodiments the decoder 406 that was used least recently may be tried first. A second factor that may be considered is how recently the decoders 406 successfully decoded an image 402, i.e., how long the decoders 406 have been in the archived set 416b. For example, in some embodiments the decoder 406 that successfully decoded an image 402 most recently (i.e., that has been in the archived set 416b for the shortest period of time) may be tried first. Of course, both of these factors may be considered. In some embodiments, the first factor may be weighted more highly than the second factor. Alternatively, in other embodiments, the second factor may be weighted more highly than the first factor. Additional factors may be considered as well.

Figure 6:
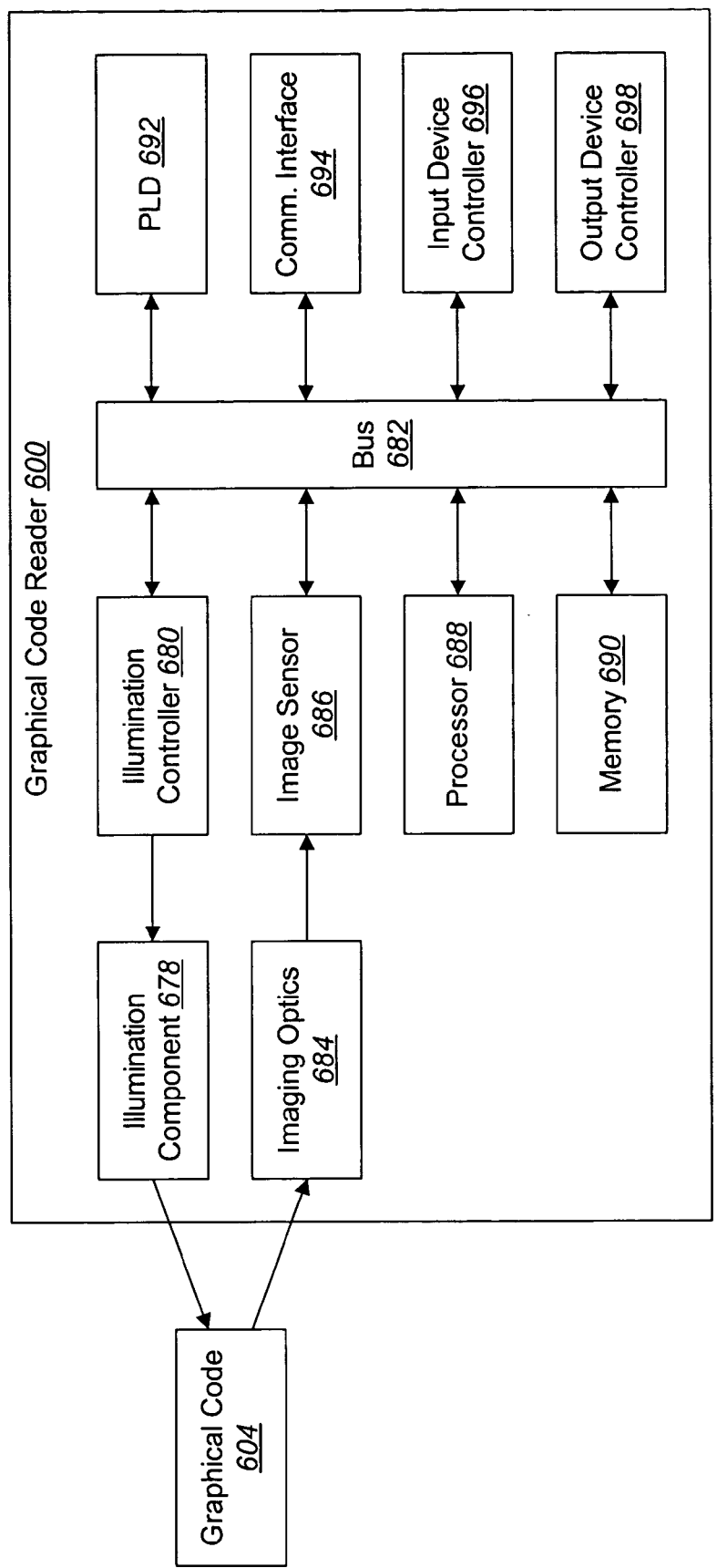
FIG. 6 is a block diagram illustrating physical components in an embodiment of a graphical code reader.

FIG. 6 is a block diagram illustrating physical components in an embodiment of a graphical code reader 600. The physical components shown in FIG. 6 may be used to implement the functional components described previously. The different components may be located within the same physical structure or in separate physical structures.

The graphical code reader 600 includes an illumination component 678. The illumination component 678 typically includes a plurality of illumination elements that may be activated to illuminate a graphical code 604. The illumination component 678 is controlled by an illumination controller 680, which is in electronic communication with other components in the graphical code reader 600 via a system bus 682.

The graphical code reader 600 also includes imaging optics 684 and an image sensor 686. The image sensor 686 includes a plurality of light-sensitive elements. The imaging optics 684 focus light reflected from the area illuminated by the illumination component 678 onto the image sensor 686. Examples of image sensors 686 include charge coupled devices (CCDs) and complementary metal-oxide semiconductor (CMOS) sensors. A housing (not shown) is typically also provided for shielding the light-sensitive elements in the image sensor 686 from ambient light. The image sensor 686 is in electronic communication with other components in the graphical code reader 600 via the system bus 682.

The graphical code reader 600 also includes a processor 688 and memory 690. The processor 688 controls the operation of the graphical code reader 600 and may be embodied as a microprocessor, a microcontroller, a digital signal processor (DSP) or other device known in the art. The processor 688 typically performs logical and arithmetic operations based on program instructions stored within the memory 690.

As used herein, the term "memory" 690 is broadly defined as any electronic component capable of storing electronic information, and may be embodied as read only memory (ROM), random access memory (RAM), magnetic disk storage media, optical storage media, flash memory devices in RAM, on-board memory included with the processor 688, EPROM memory, EEPROM memory, registers, etc. The memory 690 typically stores program instructions and other types of data. The program instructions may be executed by the processor 688 to implement some or all of the methods disclosed herein. The processor 688 and memory 690 are in electronic communication with other components in the graphical code reader 600 via the system bus 682.

The graphical code reader 600 typically also includes one or more programmable logic devices (PLDs) 692. The PLDs 692 may be programmed to carry out logic functions that implement, either partially or completely, some or all of the methods disclosed herein. Examples of different types of PLDs 692 that may be used include field-programmable gate arrays (FPGAs), logic-cell arrays (LCAs), programmed arrays of logic (PALs), complex programmable-logic devices (CPLDs), and so forth. The PLDs 692 are in electronic communication with other components in the graphical code reader 600 via the system bus 682. Those skilled in the art will recognize that one or more application-specific integrated circuits (ASICs) may be used in place of or in addition to the PLDs 692.

The graphical code reader 600 typically also includes one or more communication interfaces 694 for communicating with other electronic devices. The communication interfaces 694 may be based on wired communication technology, wireless communication technology, or both. Examples of different types of communication interfaces 694 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interfaces 694 are in electronic communication with other components in the graphical code reader 600 via the system bus 682.

The graphical code reader 600 typically also includes one or more input device controllers 696 for controlling input devices, such as keys, buttons, etc. The graphical code reader 600 typically also includes one or more output device controllers 698 for controlling output devices, such as a display screen. The input device controllers 696 and output device controllers 698 are in electronic communication with other components in the graphical code reader 600 via the system bus 682.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A graphical code reader, comprising:
a processor;
memory in electronic communication with the processor, wherein the memory is used for storing a digital image of a graphical code;
a plurality of decoders, wherein each decoder of the plurality of decoders is configured to decode at least one graphical code symbology, and wherein different decoders are configured to decode different graphical code symbologies; and
a decoder manager that implements a method comprising:
identifying a most recently successful decoder from the plurality of decoders, wherein the most recently successful decoder decoded a most recently decoded graphical code; and
instructing the most recently successful decoder to process the digital image before instructing any other decoder to process the digital image, wherein in response the most recently sucessful decoder processes the digital image before any other decoder processes the digital image.

2. The graphical code reader of claim 1, wherein if the most recently successful decoder does not decode the graphical code, the method further comprises repeatedly selecting a different decoder from the plurality of decoders to process the digital image until the graphical code is decoded or each of the plurality of decoders has processed the digital image.

3. The graphical code reader of claim 1, wherein the method further comprises stopping processing of the digital image after a defined time period.

4. The graphical code reader of claim 1, wherein the method further comprises, for each decoder that is tried, stopping processing of the digital image by the decoder after a defined time period.

5. A graphical code reader, comprising:
a processor:
memory in electronic communication with the processor, wherein the memory is used for storing a digital image of a graphical code;
a plurality of decoders, wherein each decoder of the plurality of decoders is configured to decode at least one graphical code symbology; and
a decoder manager that implements a method comprising:
identifying a most recently successful decoder from the plurality of decoders, wherein the most recently successful decoder decoded a most recently decoded graphical code; and
instructing the most recently successful decoder to process the digital image before instructing any other decoder to process the digital image;
wherein if the most recently successful decoder does not decode the graphical code, the method further comprises repeatedly selecting a different decoder from the plurality of decoders to process the digital image until the graphical code is decoded or each of the plurality of decoders has processed the digital image, and wherein the plurality of decoders are selected in order of increasing time since a most recent decode.

6. A graphical code reader, comprising:
a processor;
memory in electronic communication with the processor, wherein the memory is used for storing a digital image of a graphical code;
a plurality of decoders, wherein each decoder of the plurality of decoders is configured to decode at least one graphical code symbology; and
a decoder manager that implements a method comprising:
identifying a most recently successful decoder from the plurality of decoders, wherein the most recently successful decoder decoded a most recently decoded graphical code; and
instructing the most recently successful decoder to process the digital image before instructing any other decoder to process the digital image;
wherein the plurality of decoders comprise:
an active set of decoders; and
an archived set of decoders.

7. The graphical code reader of claim 6, wherein if the most recently successful decoder does not decode the graphical code, the method further comprises repeatedly instructing a different decoder from the active set of decoders to process the digital image until the graphical code is decoded or each decoder in the active set of decoders has processed the digital image.

8. The graphical code reader of claim 7, wherein if each decoder in the active set of decoders processes the digital image without decoding the graphical code, the method further comprises:
determining whether a condition has been satisfied for using the archived set of decoders;
if the condition has been satisfied, repeatedly instructing a different decoder from the archived set of decoders to process the digital image until the graphical code is decoded or each decoder in the archived set of decoders has processed the digital image; and
if the condition has not been satisfied, not instructing any decoder in the archived set of decoders to process the digital image.

9. The graphical code reader of claim 8, wherein the condition is that N most recent digital images captured by the graphical code reader have not been decoded.

10. The graphical code reader of claim 6, wherein if a decoder in the active set processes but does not decode the graphical code, the method further comprises:
determining whether a condition has been satisfied for moving the decoder from the active set of decoders to the archived set of decoders; and
if the condition has been satisfied, moving the decoder from the active set of decoders to the archived set of decoders.

11. The graphical code reader of claim 10, wherein the condition is that the decoder has not decoded any of N most recent digital images captured by the graphical code reader.

12. A graphical code reader, comprising:
a processor:
memory in electronic communication with the processor, wherein the memory is used for storing a digital image of a graphical code;
a plurality of decoders, wherein each decoder of the plurality of decoders is configured to decode at least one graphical code symbology; and
a decoder manager that implements a method comprising:
  identifying a most recently successful decoder from the plurality of decoders, wherein the most recently successful decoder decoded a most recently decoded graphical code;
  instructing the most recently successful decoder to process the digital image before instructing any other decoder to process the digital image; and
  stopping processing of the digital image after a defined time period, wherein the defined time period corresponds to an estimate of high probability decoding time.

13. A graphical code reader, comprising:
a processor;
memory in electronic communication with the processor, wherein the memory is used for storing a digital image of a graphical code;
a plurality of decoders, wherein each decoder of the plurality of decoders is configured to decode at least one graphical code symbology; and
a decoder manager that implements a method comprising:
  identifying a most recently successful decoder from the plurality of decoders, wherein the most recently successful decoder decoded a most recently decoded graphical code;
  instructing the most recently successful decoder to process the digital image before instructing any other decoder to process the digital image; and
  for each decoder that is tried, stopping processing of the digital image by the decoder after a defined time period, wherein the defined time period for a particular decoder corresponds to an estimate of high probability decoding time for that decoder.

14. In a graphical code reader, a method comprising:
identifying a most recently successful decoder from a plurality of decoders, wherein each decoder of the plurality of decoders is configured to decode at least one graphical code symbology, wherein different decoders are configured to decode different graphical code symbologies, and wherein the most recently successful decoder decoded a most recently decoded graphical code; and
instructing the most recently successful decoder to process a digital image of a graphical code before instructing any other decoder to process the digital image, wherein in response the most recently successful decoder processes the digital image before any other decoder processes the digital image.

15. The method of claim 14, wherein if the most recently successful decoder does not decode the graphical code, the method further comprises repeatedly instructing a different decoder from the plurality of decoders to process the digital image until the graphical code is decoded or each of the plurality of decoders has processed the digital image.

16. The method of claim 14, wherein the method further comprises stopping processing of the digital image after a defined time period.

17. The method of claim 14, further comprising, for each decoder that is tried, stopping processing of the digital image by the decoder after a defined time period.

18. In a graphical code reader, a method comprising:
identifying a most recently successful decoder from a plurality of decoders, wherein each decoder of the plurality of decoders is configured to decode at least one graphical code symbology, and wherein the most recently successful decoder decoded a most recently decoded graphical code;
instructing the most recently successful decoder to process a digital image of a graphical code before instructing any other decoder to process the digital image; and
if the most recently successful decoder does not decode the graphical code, repeatedly instructing a different decoder from the plurality of decoders to process the digital image until the graphical code is decoded or each of the plurality of decoders has processed the digital image, wherein the plurality of decoders is selected in order of increasing time since a most recent decode.

19. In a graphical code reader, a method comprising:
identifying a most recently successful decoder from a plurality of decoders, wherein each decoder of the plurality of decoders is configured to decode at least one graphical code symbology, and wherein the most recently successful decoder decoded a most recently decoded graphical code; and
instructing the most recently successful decoder to process a digital image of a graphical code before instructing any other decoder to process the digital image;
wherein the plurality of decoders comprise:
  an active set of decoders; and
  an archived set of decoders.

20. The method of claim 19, wherein if the most recently successful decoder does not decode the graphical code, the method further comprises repeatedly instructing a different decoder from the active set of decoders to process the digital image until the graphical code is decoded or each decoder in the active set of decoders has processed the digital image.

21. The method of claim 20, wherein if each decoder in the active set of decoders processes the digital image without decoding the graphical code, the method further comprises:
determining whether a condition has been satisfied for using the archived set of decoders;
if the condition has been satisfied, repeatedly instructing a different decoder from the archived set of decoders to process the digital image until the graphical code is decoded or each decoder in the archived set of decoders has processed the digital image; and
if the condition has not been satisfied, not instructing any decoder in the archived set of decoders to process the digital image.

22. The method of claim 21, wherein the condition is that N most recent digital images captured by the graphical code reader have not been decoded.

23. The method of claim 19, wherein if a decoder in the active set processes but does not decode the graphical code, the method further comprises:
determining whether a condition has been satisfied for moving the decoder from the active set of decoders to the archived set of decoders; and
if the condition has been satisfied, moving the decoder from the active set of decoders to the archived set of decoders.

24. The method of claim 23, wherein the condition is that the decoder has not decoded any of N most recent digital images captured by the graphical code reader.

25. In a graphical code reader, a method comprising:
identifying a most recently successful decoder from a plurality of decoders, wherein each decoder of the plurality of decoders is configured to decode at least one graphical code symbology, and wherein the most recently successful decoder decoded a most recently decoded graphical code;
instructing the most recently successful decoder to process a digital image of a graphical code before instructing any other decoder to process the digital image; and
stopping processing of the digital image after a defined time period, wherein the defined time period corresponds to an estimate of high probability decoding time.

26. In a graphical code reader, a method comprising:
identifying a most recently successful decoder from a plurality of decoders, wherein each decoder of the plurality of decoders is configured to decode at least one graphical code symbology, and wherein the most recently successful decoder decoded a most recently decoded graphical code;
instructing the most recently successful decoder to process a digital image of a graphical code before instructing any other decoder to process the digital image; and
for each decoder that is tried, stopping processing of the digital image by the decoder after a defined time period, wherein the defined time period for a particular decoder corresponds to an estimate of high probability decoding time for that decoder.

* * * * *